United States Patent [19]

Goodwin et al.

[11] Patent Number: 5,730,566
[45] Date of Patent: Mar. 24, 1998

[54] ANTI-CROSS THREADING FASTENER

[76] Inventors: Jerry J. Goodwin, 5998 Runnymeade, Canton, Mich. 48187; Michael A. Garver, 25171 Sullivan, Novi, Mich. 48375; Anthony L. Snoddy, 1315 Wellesley Dr., Detroit, Mich. 48203-1473

[21] Appl. No.: 859,662

[22] Filed: May 20, 1997

Related U.S. Application Data

[63] Continuation of Ser. No. 505,031, Jul. 21, 1995, abandoned.

[51] Int. Cl.$^6$ .................................... F16B 25/00
[52] U.S. Cl. ................... 411/386; 411/411; 411/423
[58] Field of Search .......................... 411/386, 411, 411/423, 436, 412

[56] References Cited

U.S. PATENT DOCUMENTS

| | | | |
|---|---|---|---|
| 3,586,353 | 6/1971 | Lorenz et al. | 285/334 |
| 4,084,829 | 4/1978 | Fälchle et al. | 279/99 |
| 4,179,976 | 12/1979 | Sygnator | 411/423 |
| 4,549,754 | 10/1985 | Saunders et al. | 411/423 |
| 4,658,088 | 4/1987 | Gartland, Jr. et al. | 411/411 |
| 4,789,288 | 12/1988 | Peterson | 411/386 |
| 4,815,907 | 3/1989 | Williamson et al. | 411/107 |
| 4,907,930 | 3/1990 | Peterson | 411/437 |
| 4,915,560 | 4/1990 | Peterson et al. | 411/386 |
| 4,952,110 | 8/1990 | Avgoustis et al. | 411/386 |
| 4,983,084 | 1/1991 | Gray | 411/311 |
| 5,259,398 | 11/1993 | Vrespa | 128/898 |
| 5,304,022 | 4/1994 | Huska | 411/366 |
| 5,320,467 | 6/1994 | Erbes | 411/386 |
| 5,419,667 | 5/1995 | Avgoustis | 411/386 |

FOREIGN PATENT DOCUMENTS 2697875  11/1992  France .................... F16B 23/00

*Primary Examiner*—Steven N. Meyers
*Assistant Examiner*—Tuyet-Phuong Pham
*Attorney, Agent, or Firm*—Katz & Cotton LLP

[57] ABSTRACT

A self-aligning, anti-cross threading fastener having a first member with lead threads having a curved surface feature from the minor diameter to the major diameter which allows the surface of the lead threads to cam over the mating threads of a second member and thereby aligning collinearly the longitudinal axis of the two members. The initial presentation angle of the two threaded members may be restricted and therefore enhanced by providing a protruding diameter feature.

14 Claims, 4 Drawing Sheets

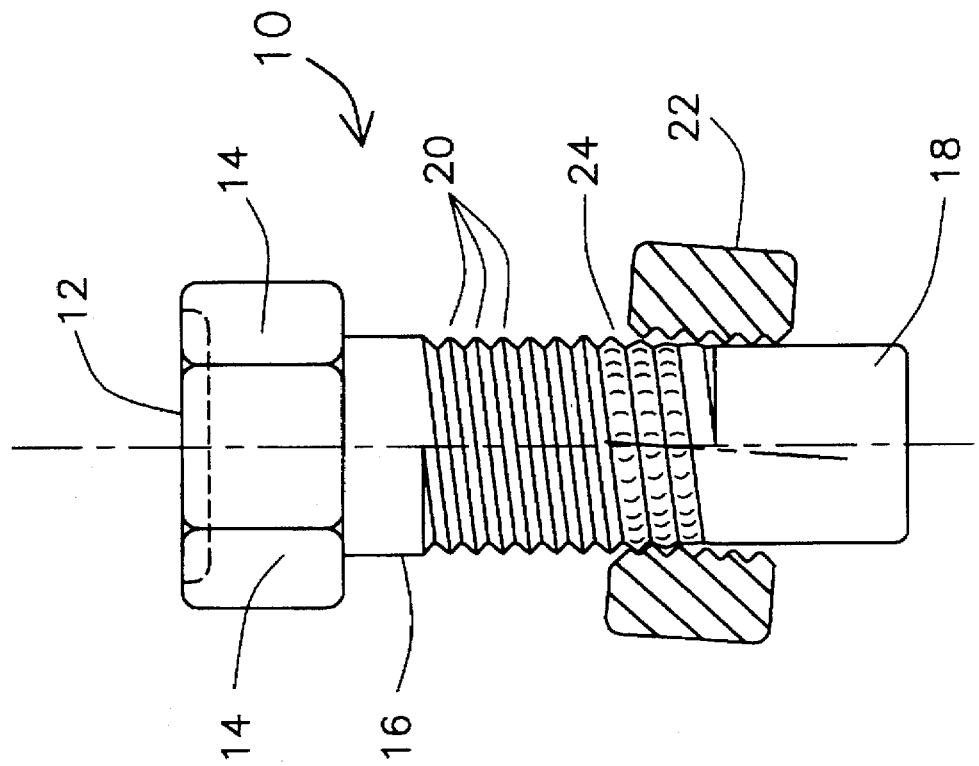
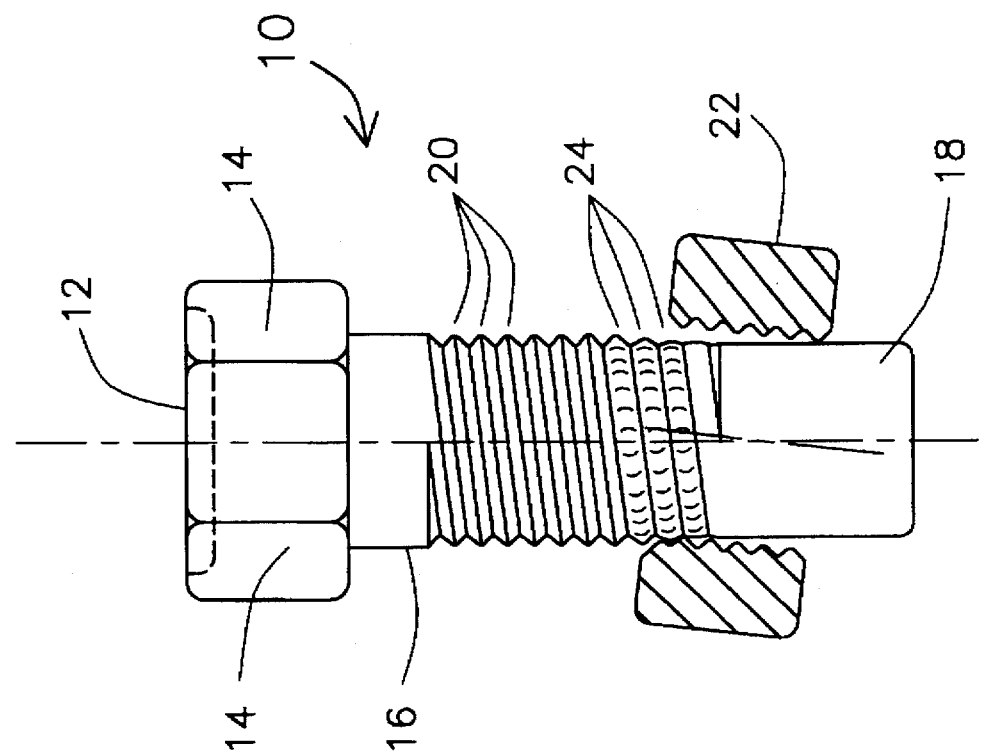

ANTI-CROSS THREADING FASTENER

This application is a continuation of application Ser. No. 08/505,031, filed Jul. 21, 1995, now abandoned.

BACKGROUND OF THE INVENTION

1. Field of the Invention

The present invention relates to threaded fasteners such as screws or bolts, and more particularly, to anti-cross threading fasteners.

2. Description of the Related Technology

Threaded fastener technology is basic to the construction or fabrication of most articles of manufacture such as machines, automobiles, trains, plains, engines, and the like. A threaded fastener may be a bolt, screw, stud, rod, or other substantially round member having a uniform, nonuniform or tapered external helical thread that can be screwably engaged into a mating nut, bolt or hole having a substantially matching internal helical thread. For proper engagement of the external and internal threads, the longitudinal axis of the externally threaded member must be substantially collinear with the longitudinal axis of the mating internally threaded member. When the externally threaded member is not substantially collinear with the internally threaded member, cross-threading occurs.

Cross-threading generally occurs when there is a misalignment between the externally threaded member, typically a screw or bolt, and the internally threaded member, typically a nut or other threaded hole. Specifically, cross-threading is the result of the threads of the two members attempting to engage at least one half pitch out of alignment. When this situation happens, the two members are not collinear with each other and wedging of the threads will occur as the threaded helixes are rotated against each other. If rotation continues, then threads on one or both members will be structurally damaged.

What is needed is a fastener that prevents cross threading when an externally threaded member engages an internally threaded member.

SUMMARY OF THE INVENTION

It is therefore an object of the present invention to prevent cross-threading when an externally threaded member engages an internally threaded member.

Another object is to correct misalignment (noncollinearity) between two screwably attachable members having mating helical threads thereon.

Another object of the present invention is to easily correct misalignment that may cause cross threading of a threaded fastener.

Yet another object of the present invention is to correct misalignment between a first fastening member and a second fastening member by having the first several threads of the first member cam over the threads of the second member, thereby bringing the first and second members into collinear alignment.

Still another object is to use a protruding diameter feature at one end of the first member to restrict the misalignment angle between the two members.

In an embodiment of the present invention, a self alignment anti-cross threading fastener comprises a substantially round first member such as, for example, a bolt or screw, having an external helically wound thread on the shank of the first member. At one end of the first member shank is a head adapted to be engaged by a means for applying rotational torque. The head may be slotted to receive a flat, Phillips, torque head and the like screwdriver blade, or may have a plurality of flat surfaces parallel with the longitudinal axis of the first member shank for receiving a wrench, socket or other means for rotationally engaging the head.

At the other end of the first member shank, the first preferably at least two of the helical threads have a transitionally curved surface from the minor diameter to the major diameter. The transitional curved surface of the first at least two helical threads of the first member are adapted to cam over the mating component threads of the second member when in a cross-threading position, thereby collinearly aligning the first and second members together.

In another embodiment of the invention, the end of the first member opposite the head may have a protruding diameter feature, commonly referred to as a dog point. This protruding diameter feature restricts the range of presentation angles when the first member is inserted into the second member. Thus, the inherent misalignment may be restricted so that the first at least two helical threads having the transitionally curved surface may easily cam over the mating component threads so as to rapidly bring the two members into the correct collinear alignment wherein the remaining threads of the first and second members rotationally engage to properly fasten as intended.

The curved surface on the transitional threads may be formed by rolling the threads in a rolling die having a mirror image contour of the curved surface desired on the threads. The transitional thread curved surface may also be formed on the threads by cutting, burnishing, grinding, machining, polishing, laser, or any combination thereof.

A feature of the present invention is a transitional curved surface from the minor diameter to the major diameter of the first at least two external threads of a first member, whereby the external thread surface area cams over the mating component threads of a second member and thereby collinearly realigns the first and second members together.

Another feature of the present invention is a protruding diameter feature, commonly referred to as a dog point, for restricting the presentation engagement angle of the two members.

An advantage of the present invention is a reliable and simple way of preventing cross-threading of a threaded fastener.

Another advantage is quick and reliable collinear alignment of a threaded fastener when rotatably engaging the threaded fastener by machine or unskilled labor.

Other and further objects, features and advantages will be apparent from the following description from the presently preferred embodiment of the invention, given for the purpose of disclosure and taken in conjunction with the accompanying drawings.

BRIEF DESCRIPTION OF THE DRAWINGS

FIGS. 1A–1D illustrate schematic elevational views of a preferred embodiment of the present invention at various stages of threading engagement.

DETAILED DESCRIPTION OF THE PREFERRED EMBODIMENT

Figure 1C:
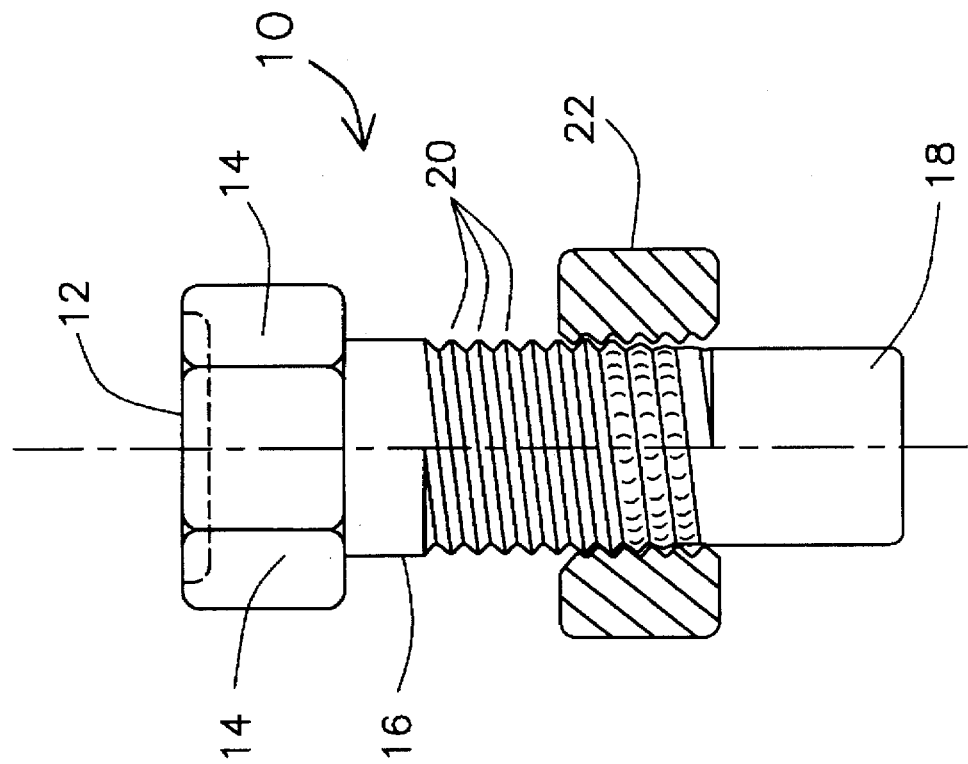

The present invention is an anti-cross threading fastener having a self alignment feature that is new, novel and nonobvious over the related technology. In the present invention, when the opposing thread helixes address each other, there is a natural tendency to collinearly align there respective mating planes during rotation. By providing the lead threads a transitional curved surface feature from the minor diameter to the major diameter of the threads, any misalignment of the threads will cause the lead thread surface to cam over the mating component thread and thus realign. The initial presentation angle of the mating component threads may be restricted and thereby reduce the misalignment angle by providing a protruding diameter feature before the transitional threads.

Referring now to the drawings, the details of the preferred embodiment of the invention are schematically illustrated. Like elements are numbered the same, and similar elements are represented by the same number and a different lower case letter suffix. Referring now to FIGS. 1A–1D, schematic elevational views of the present invention at various stages of threading engagement are illustrated. A threaded fastener bolt is illustrated and generally designated by the reference numeral 10. The threaded bolt 10 comprises a head 12 having flat faces 14, a threaded shank 16, and a protruding diameter member opposite the head 12, commonly referred to as a dog point 18.

The head 12 is adapted to be engaged by a tool (not illustrated) for applying rotational torque to the bolt 10. A plurality of faces 14 on the head 12 provide flat surfaces adapted to receive and provide a non-slip surface for the tool such as a wrench, socket, pliers and the like. The head 12 may also be slotted to receive a screwdriver blade (flat, Phillips, Torque, etc.). It is the intent of the invention to encompass all adaptations for imparting rotational torque to the bolt 10. In addition, the invention may be utilized with any type of threaded fastener such as, for example, a bolt, screw, stud, rod or other substantially round member having a uniform, nonuniform or tapered external helical thread that can be screwably engaged into a mating member such as a nut, bolt or hole having a substantially matching internal helical thread. The mating member (nut illustrated in cross section) is generally represented by the numeral 22.

FIG. 1A illustrates the initial installation of the bolt 10 and nut 22 at a maximum misalignment condition. The dog point 18 restricts the angular misalignment of the helical threads on the shank 16 and the nut 22. The dog point 18 is optional and may be absent for short bolts or shallow threaded holes with a blocked bottom. The dog point 18 diameter preferably may be 90 percent of the minor inside diameter of the nut 22 and approximately one nominal size diameter of the shank 16 in length.

FIG. 1B illustrates the relative angular position between the bolt 10 and nut 22 after an initial 360 degree rotation. As illustrated, the first and second transitional threads 24 are engaging the left mating threads (of the sectional view) of the nut 22 and the curved surfaces on the threads 24 cam over the right mating threads (of the sectional view) on the nut 22.

FIG. 1C illustrates the engagement of the threads 24 with the mating threads of the nut 22 after two full rotations (720 degrees). It can be seen that the threaded helixes of the bolt 10 and nut 22 have forced their respective planes to align and the axis of both the bolt 10 and nut 22 to become collinear. As a result, the threads 20 are no longer positioned to become cross-threaded with the mating threads of the nut 22.

Figure 1D:
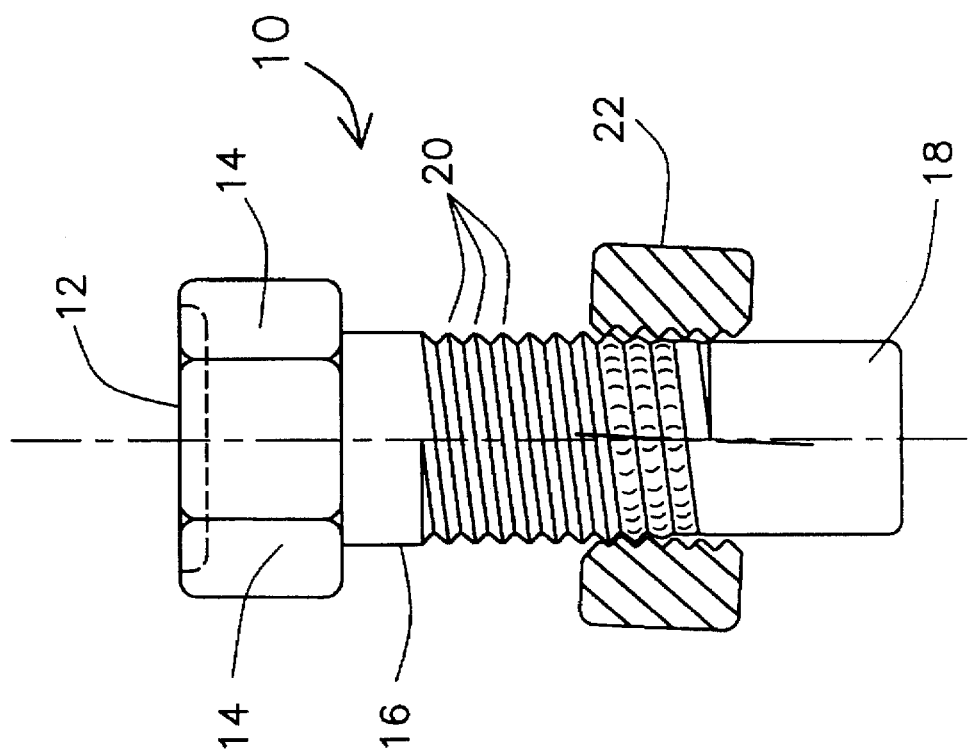

FIG. 1D illustrates full and proper engagement of the bolt 10 and nut 22 in a correct collinear alignment so that there is no possibility that the threads 22 can wedge against the mating threads of the nut 22 to become cross-threaded. An advantage of the present invention is its ability to prevent cross-threading by unskilled workers or by automatic insertion and fastening machines that may be out of adjustment.

Figure 2:
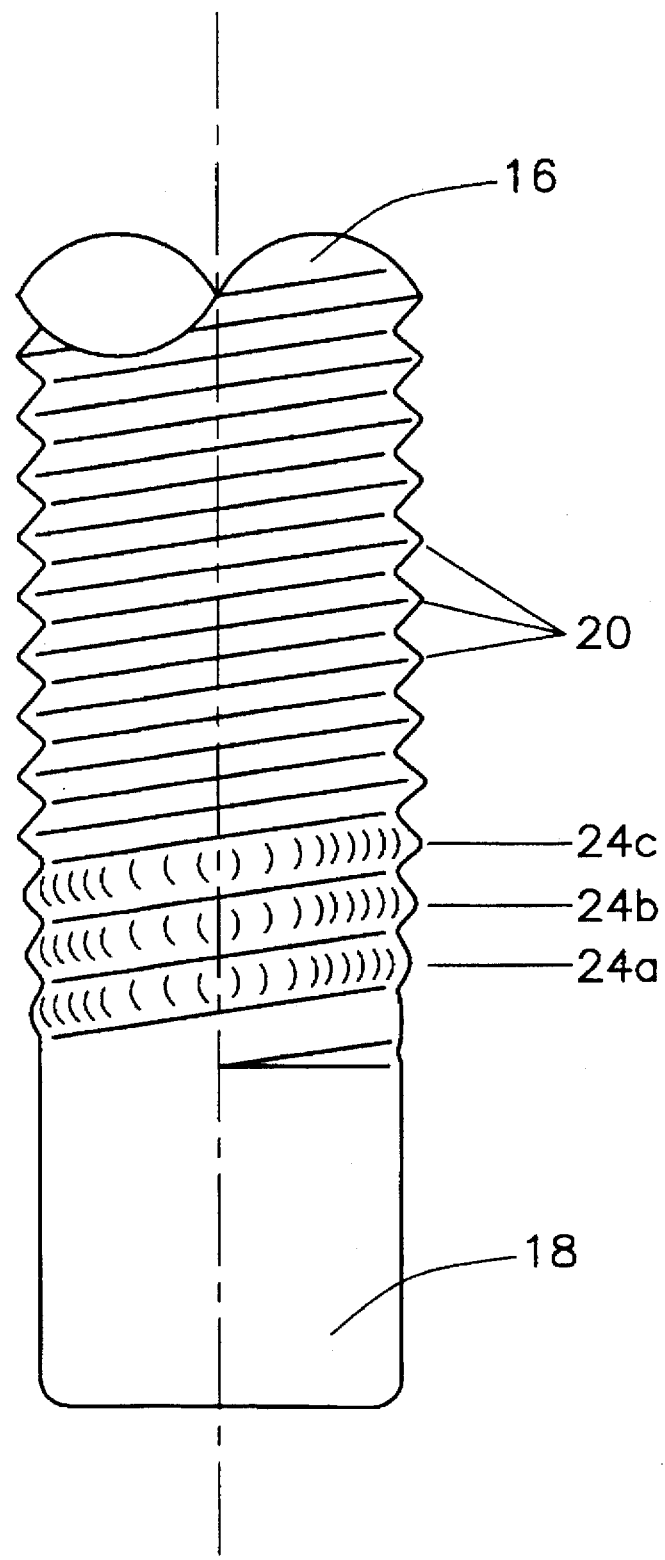
FIG. 2 illustrates a schematic elevational view of the external threads according to the present invention of FIGS. 1A–1D.

Referring now to FIG. 2, a schematic elevational partial view of the threaded shank 16 of FIGS. 1A–1D is illustrated. The shank 16 has threads such as standard machine threads and at least two transitional threads 24 toward the end of the shank 16 opposite the head 12. The dog point 18 is also illustrated but is not required for all configurations of the present invention. Three transitional threads 24a, 24b and 24c are illustrated. Only two transitional threads 24a and 24b are necessary for operation of the present invention, however, more than three threads 24 may also be used.

The threads 24 have the same minor thread diameter as the other threads 20, but differ in that a curved surface is blended into the flanks of the threads 24. The curved surface of the threads 24 may be round, parabolic or any other curved shape that may be easily rolled when forming the threads 20, 24 on the shank 16. The outside diameter of the primary transition thread 24 preferably does not exceed the pitch diameter and may start anywhere from the first transition thread 24a inward (24b and 24c). The outer diameter of the transition threads 24 are such as to allow them to easily cam over the first few inside threads of the nut 22 (FIG. 1). Once these transition threads 24 cam over during misalignment, the remaining external machine threads 20 are in substantially correct alignment with the mating internal threads of the nut 22 so that cross-threading does not occur.

Figure 3:
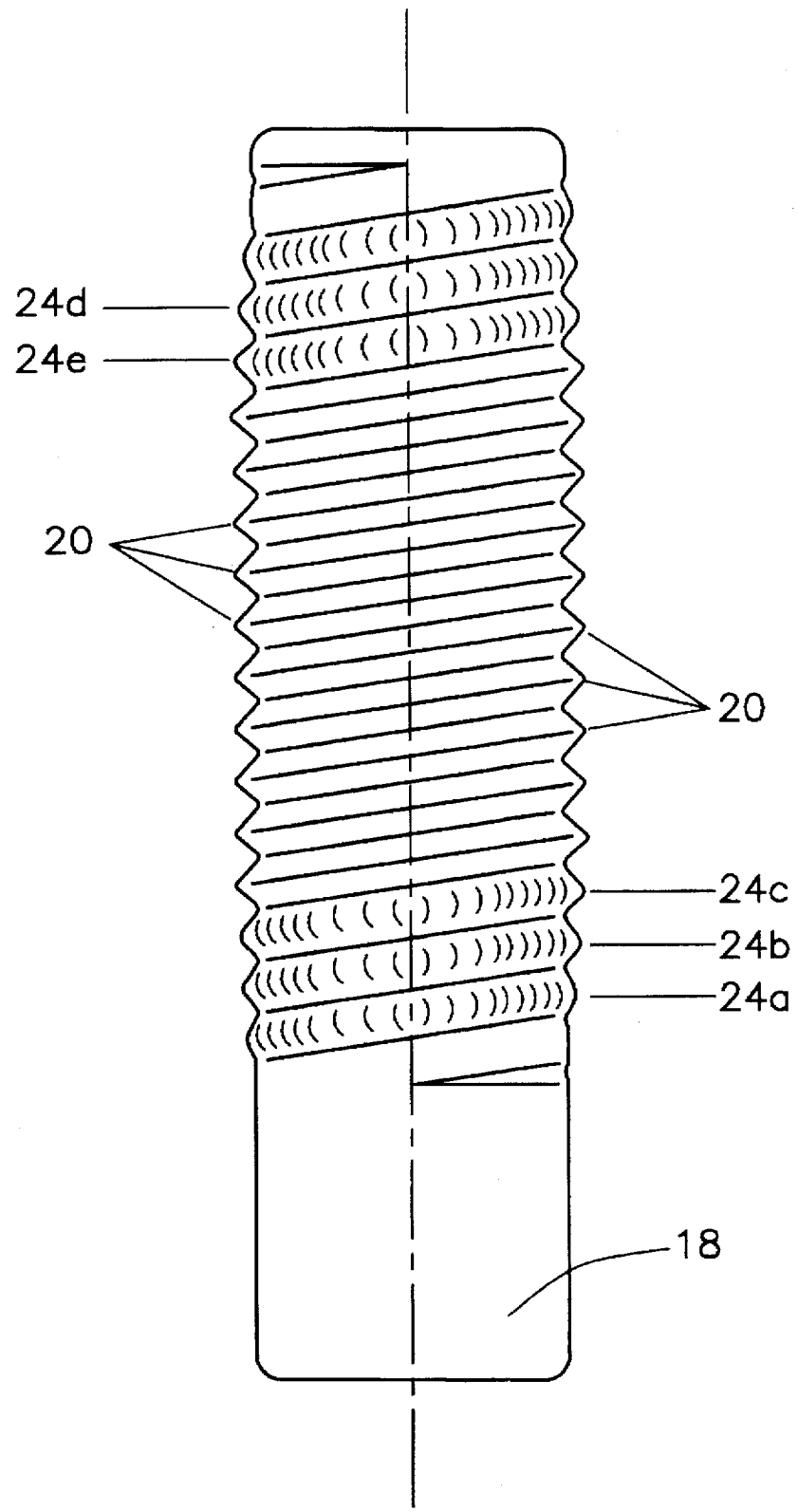
FIG. 3 illustrates a schematic elevational view of the present invention on a rod.

Referring now to FIG. 3, a schematic elevational view of an embodiment of the present invention illustrating a rod. The rod is a substantially round shank member having first and second ends and a plurality of threads 20 around the circumference of the shank member. At least two threads 24a and 24b of the plurality of treads 20 are proximate to the first end and have curved surfaces from the minor diameter to the major diameter and at least two other threads 24d and 24e of the plurality of threads 20 are proximate to the second end of said shank member and having curved surfaces from the minor diameter to the major diameter. The at least two threads 24a and 24b (or 24d and 24e) are adapted to cam over mating threads of a receiving member (not illustrated) whereby the longitudinal axis of said shank member and said receiving member become substantially collinearly aligned.

The threads 20, 24 on shank 16 may be formed by rolling, cutting, burnishing, grinding, machining, polishing, laser or any combination thereof. A novel aspect of the present invention is the use of a special thread roll die having the desired curvature for the transitional threads as well as the machine threads to be formed on a blank tubular shank. The special thread roll die may be used with a standard thread rolling machine to produce the novel features of the present invention. The special thread roll die has a mirror image of the desired threads 20, 24 so that when the blank shank is rolled to produce threads thereon, the desired curvature and radius on the transition threads are also produced.

The present invention, therefore, is well adapted to carry out the objects and attain the ends and advantages mentioned, as well as others inherent therein. While a presently preferred embodiment of the invention has been given for purposes of disclosure, numerous changes in the details of procedures for accomplishing the desired results, will readily suggest themselves to those skilled in the art, and which are encompassed within the spirit of the invention and the scope of the appended claims.

What is claimed is:

1. An anti-cross threading fastener, comprising:
   a substantially round shank member having first and second ends and a continuous helix comprised of a plurality of threads around a circumference of said shank member, the plurality of threads having a constant minor diameter and the plurality of threads being adapted to mate with corresponding threads of a receiving member;
   at least two threads of the plurality of threads proximate the first end of said shank member and having an outside diameter and a surface;
   the remaining plurality of threads having a major diameter; and
   the outside diameter of the at least two threads is smaller than the major diameter of the remaining plurality of threads, and the surface of the at least two threads is substantially curved from the minor diameter to the outside diameter so that the at least two threads of the plurality of threads is adapted to cam over corresponding mating threads of a receiving member until there is substantially collinear alignment therebetween.

2. The fastener of claim 1, further comprising a head fixedly attached to the second end of said shank member, said head adapted for transmission of rotational torque to said shank member.

3. The fastener of claim 2, wherein said head is adapted to receive a screwdriver blade.

4. The fastener of claim 2, wherein said head has a plurality of flat faces substantially parallel with a longitudinal axis of said shank member, the flat faces being adapted to receive a means for producing rotational torque.

5. The fastener of claim 4, wherein the rotational torque means is selected from the group consisting of a wrench, a socket and a nut driver.

6. The fastener of claim 1, further comprising at least two other threads of the plurality of threads proximate the second end of said shank member and having an outside diameter and a surface, the outside diameter of the at least two other threads is smaller than the major diameter of the remaining plurality of threads, and the surface of the at least two other threads is substantially curved from the minor diameter to the outside diameter so that the at least two other threads of the plurality of threads is adapted to cam over corresponding mating threads of another receiving member until there is substantially collinear alignment therebetween.

7. The fastener of claim 1, further comprising a protruding diameter member attached to and collinear with the first end of said shank member, said protruding diameter member adapted to restrict a presentation angle between said shank member and a receiving member.

8. The fastener of claim 7, wherein a diameter of said protruding diameter member is about 90 percent of the minor diameter of the plurality of threads and about one diameter of said shank member in length.

9. An anti-cross threading fastener system, said system comprising:
   a substantially round shank member having first and second ends and a continuous helix comprised of a plurality of threads around a circumference of said shank member, the plurality of threads having a constant minor diameter;
   a head, said head fixedly attached to the second end of said shank member, said head adapted for transmission of rotational torque to said shank member;
   a receiving member for receiving the first end and plurality of threads of said shank member and having corresponding threads inside said receiving member for mating with the plurality of threads of said shank member;
   at least two threads of the plurality of threads proximate the first end of said shank member and having an outside diameter and a surface;
   the remaining plurality of threads having a major diameter; and
   the outside diameter of the at least two threads is smaller than the major diameter of the remaining plurality of threads, and the surface of the at least two threads is substantially curved from the minor diameter to the major diameter such that the at least two threads of the plurality of threads cam over the corresponding mating threads of said receiving member until there is substantially collinear alignment therebetween whereby a longitudinal axis of said shank member and a longitudinal axis of said receiving member become substantially collinearly aligned.

10. The system of claim 9, wherein said shank member is a bolt.

11. The system of claim 9, wherein said shank member is a screw.

12. The system of claim 9, wherein said receiving member is a nut.

13. The system of claim 9, wherein said receiving member is a threaded hole.

14. A method of correcting misalignment between first and second members of a threaded fastener to prevent cross threading, said method comprising the steps of:
   inserting a first end of a first member into a second member at a non-collinear angle, the first member having a continuous helix comprised of a plurality of threads around a circumference of the first member, the plurality of threads having a constant minor diameter, at least two threads of the plurality of threads proximate the first end of said shank member and having an outside diameter and a surface, the remaining plurality of threads having a major diameter, the outside diameter of the at least two threads is smaller than the major diameter of the remaining plurality of threads, and the surface of the at least two threads is substantially curved from the minor diameter to the outside diameter, the plurality of threads being adapted to mate with corresponding threads of the second member;
   rotating the first member in relation to the second member, wherein the at least two threads of the plurality of threads proximate the first end of the first member engage the corresponding mating threads of the second member such that the at least two threads of the plurality of threads of the first member cam over corresponding mating threads of the second member until there is substantially collinear alignment therebetween.

* * * * *